UNITED STATES PATENT OFFICE 2,861,876
Patented Nov. 25, 1958

2,861,876

METHOD OF DESTROYING UNDESIRED PLANTS

Gail H. Birum, Dayton, Ohio, assignor to Monsanto Chemical Company, St. Louis, Mo., a corporation of Delaware No Drawing. Application December 1, 1955
Serial No. 550,473

6 Claims. (Cl. 71—2.6)

The present invention provides new and highly valuable herbicidal compositions and methods of destroying or preventing plant growth in which said compositions are employed.

I have found that improved, very efficient herbicidal compositions are obtained when there are prepared oil-in-water emulsions of phosphorothioates of the following structural formula:

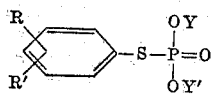

in which R and R' are selected from the class consisting of hydrogen, chlorine, the nitro radical and alkyl radicals of from 1 to 5 carbon atoms and Y and Y' are selected from the class consisting of alkyl and chloroalkyl radicals of from 1 to 12 carbon atoms. Phosphorothioates of the above formula are readily available compounds which are obtainable in known manner by the condensation of an appropriate aromatic sulfenyl chloride with the appropriate alkyl or chloroalkyl phosphite.

The following phosphorothioates are representative of the compounds included within the scope of the structural formula:

Diisopropyl S-(o-nitrophenyl) phosphorothioate
Diethyl S-(2-ethyl-4-nitrophenyl) phosphorothioate
O,O-di-n-octyl S-(2-chloro-3-n-propyl)phenyl phosphorothioate
O,O,-dibutyl S-(o-nitrophenyl) phosphorothioate
S-(p-chlorophenyl)O,O-diethyl phosphorothioate
O,O-bis(2-chloroethyl) S-(p-chlorophenyl) phosphorothioate
O,O-diethyl S-phenyl phosphorothioate
O,O-bis(2-chloroethyl) (S-2-ethylphenyl) phosphorothioate
O,O-dimethyl S-(2,4-dinitrophenyl) phosphorothioate
O,O-diethyl S-(o-nitrophenyl) phosphorothioate
S-(p-chlorophenyl)-O,O-diisopropyl phosphorothioate
S-(4-chloro-2-nitrophenyl)-O,O-dimethyl phosphorothioate
S-(4-chloro-2-nitrophenyl)-O,O-diethyl phosphorothioate
S-(4-chloro-2-nitrophenyl)-O,O-diisopropyl phosphorothioate
O,O-bis(2-ethylhexyl) S-(o-nitrophenyl) phosphorothioate
O,O-bis(2-chloroethyl) S-(o-nitrophenyl) phosphorothioate
O,O-dimethyl S-(2,3-dichlorophenyl) phosphorothioate
O,O-didodecyl S-(o-tolyl) phosphorothioate
O,O-diamyl S-(2,4-diamylphenyl) phosphorothioate Although any one or more of the above compounds may be used effectively, other types of phosphorothioates having alkyl groups of various chain length are likewise useful. Thus, mixed esters such as O-amyl O-ethyl S-(3-nitrophenyl) phosphorothioate or O-n-dodecyl O-propyl S-(2,3-dichlorophenyl) phosphorothioate possess herbicidal activity as well as phosphorothioates derived from the condensation of a chlorobenzenesulfenyl chloride or a nitrobenzenesulfenyl chloride and a trialkyl phosphite prepared from technical mixtures of alcohols, e. g., the alcohols made according to the "Oxo" process from olefin polymers, carbon monoxide and hydrogen.

I have found that improved, very efficient herbicidal compositions are obtained when there are prepared oil-in-water emulsions of the present phosphorothioates. The word "oil" is here used to designate any organic liquid which is insoluble in water. The emulsions may be obtained by first dissolving the phosphorothioate in an organic material which is a solvent therefor and then mixing the organic solution with water in the presence of an emulsifying agent. Because of the high activity of these phosphorothioates against plant growth, and the efficiency with which organic solutions of the same may be dispersed in an aqueous vehicle, extremely good herbicidal properties are evidenced by emulsions having only very small concentrations of the phosphorothioate, for example, concentrations of from 0.1 percent to 1.0 percent by weight of the total weight of the emulsion.

Emulsifying agents which may be employed are those customarily used in the art for the preparation of oil-in-water emulsions, e. g., ionic or non-ionic emulsifying or dispersing agents such as the long-chain alkylbenzenesulfonates or polyglycol ethers. The emulsifying agents are likewise employed in only very small concentrations, say, in a quantity of from 0.5% to 2.0% by weight of the total weight of the emulsion.

Although the present phosphorothioates possess general herbicidal activity when used in foliage contact sprays and dusts, they may demonstrate selective effects when employed as preemergent herbicides. Depending upon the concentration of the present phosphorus esters which is employed, they may be used to prevent the growth of any plants in media normally supporting plant growth, or they may be used to prevent germination and growth of certain plants while permitting normal development of others. Thus, when certain of the present esters are applied to soil at a concentration of 50 lbs./acre, the preemergent effect is noted with both broad-leafed and narrow-leafed plants; whereas at a 25 lb./acre rate, growth of such plants as cucumber, corn and cotton is not at all adversely affected. At an even lower rate, say, at 10 lb./acre, a further selectivity is evidenced. Suprisingly, there results a difference of effect within the class of broad-leafed plants and within the class of narrow-leafed plants. At this lower rate growth of such broad-leafed plants as beet and clover is inhibited, whereas mustard, cucumber and cotton are hardly, if at all, affected. Of the narrow-leafed plants, rye grass is not affected whereas germination and growth of wild oat and cheat grass are markedly hindered. Because of this difference in activity at the lower concentration, the present phosphorothioates show promise as agents for inhibiting or preventing undesirable grasses while not adversely affecting the growth of others.

As will be shown hereinafter, the present phosphorothioates are particularly valuable as the active ingredients in compositions for defoliating board-leafed plants prior to harvesting of non-leafy corps. Concentrations of the esters which are insufficient to kill the whole plant but which are sufficient to cause leaf-drop are advantageously employed on annuals or perennials in order to faciliate harvesting of such crops as cotton, beans, peanuts, etc., or to prevent fungus and insect damage which is often the consequence of too profuse foliage during the period in which bolls or pods are maturing or ripening.

The invention is further illustrated, but not limited, by the following examples:

Example 1

Flats containing two week old plants of wild oats, cheat grass, rye grass, buckwheat, morning glory, red clover, mustard, beet, cotton, cucumber and corn as well as Black Valentine bean plants having one mature trifoliate and one partially opened trifoliate were used for herbicidal testing of the following compounds:

(I) S-(4-chlorophenyl) O,O-dimethyl phosphorothioate
(II) S-(4-chlorophenyl) O,O-diethyl phosphorothioate
(III) Bis(O,O-2-chloroethyl) S-2-nitrophenyl phosphorothioate
(IV) Bis(O,O-2-chloroethyl) S-4-chlorophenyl phosphorothioate Emulsion sprays were prepared by respectively dissolving the above compounds in acetone and adding the resulting solution to water in a quantity to make up an 0.5 percent concentration of the phosphorothioate. The flat of plants was respectively sprayed to run-off with one of said emulsions. The sprayed flats were then placed in the greenhouse under ordinary conditions of sunlight and watering for ten days. Observation of the plants at the end of this time showed that except for the beans all of the broad-leafed plants and all of the grasses which had been sprayed with either the emulsion of (I) or (III) were dead. Those of the broad-leafed plants, except the beans and cotton and all of the grasses which had been sprayed with the emulsion of (II) were dead. The emulsion of (IIV) had seriously injured all of the grasses and had killed all of the broad-leafed plants except cotton, bean and morning glory. With each of the test emulsions the bean plants were defoliated whereas the stalks showed from slight to healthy regrowth. Defoliant effect on bean with only slight to moderate injury of stalks was also evidenced when (I) was used in 0.2 percent concentration or when (III) was used in 0.1 percent concentration.

Example 2

Herbicidal sprays were prepared by dissolving the following phosphorothioates in cyclohexanone and adding the resulting solutions (together with an emulsifier) to water to give respective emulsions containing 0.2 percent of the phosphorothioate based on the weight of the total emulsion. The following esters were used:

(1) O,O-dimethyl S-(2-nitrophenyl) phosphorothioate
(2) O,O-diisopropyl S-(2-nitrophenyl) phosphorothioate
(3) S-(4-chloro-2-nitrophenyl) O,O-diethyl phosphorothioate The quantity of emlusifying agent which was used was 0.2 percent by weight of the total emulsion and the emulsifying agent which was used was "Emulsifier L" (a mixture of a polyalkylene glycol and an alkylbenzenesulfonate). The foliage of potted bean plants was sprayed to run-off with the respective emulsions, two plants being used for each test emulsion. The sprayed pots of plants as well as "blank" pots of plants which had been sprayed with an emulsion containing cyclohexanone and said "Emulsifier L" in the quantity present in said test emulsions were placed in the greenhouse under ordinary conditions of sunlight and watering. Observations of the plants at the end of ten days showed those in the "blank" pots to be flourishing, whereas those which had been sprayed with said emulsions of (1), (2) or (3) were very severely injured.

Example 3

This example shows evaluation of S-(4-chlorophenyl) O,O-diethyl phosphorothioate as a pre-emergent herbicide. Briefly, the chemical is applied in spray form to soil seeded to representative grasses and broad-leaf plants.

Aluminum pans, 13" x 9" x 2", were filled with a good grade of top soil which had been screened through a ¼" wire mesh and mixed with sand in a preparation of two parts of the top soil to one part of the sand. The soil surface was then compacted to a depth of ⅜" from the top of the pan. Twenty seeds each of wild oats, cheat grass, rye grass and buckwheat were then scattered randomly over ⅓ of the area of the soil surface and five corn seeds were planted uniformly in this same area. Over the remaining ⅔ of the area, twenty seeds each of the following broad-leaf plants were scattered randomly: mustard, red clover, beet, cotton, and cucumber. The seeds were then covered with soil to the pan top.

The present herbicidal solution was prepared by dissolving 0.4 g. of S-(4-chlorophenyl) O,O-diethyl phosphorothioate in 20 cc. of acetone. Ten ml. of this solution was diluted with water to 30 cc. Application of this quantity of the solution to said pans is calculated to correspond to the use of 25 lbs. of the phosphorothioate per acre. Another solution calculated to correspond to 10 lbs. of the phosphorothioate per acre was prepared by diluting 4 ml. of the acetone solution to 30 cc.

The planted pans were then placed in an exhaust hood and sprayed first with 30 cc. of an aqueous solution of a liquid fertilizer and 0.1% solution of octamethyl pyrophosphoramide. The liquid fertilizer was employed to give a uniform nutrition level and the amide was employed to prevent insect injury. Three pans were then respectively sprayed with either the 25 lb. per acre or the 10 lb. per acre solution of the phosphorothioate. One of the pans which had been planted and treated with the liquid fertilizer and octamethyl pyrophosphoramide in the same manner was set aside to be used as a "blank." The three pans were then placed in ½" of water and allowed to absorb moisture through perforated bottoms until the soil surface was completely moist. The pans were then transferred to a wet sand bench in the greenhouse, and maintained there for ten days under ordinary conditions of sunlight and watering.

Observation of the pans at the end of that time showed that the pan which had been sprayed with the 25 lb. per acre solution of the phosphorothioate indicated complete to very pronounced suppression of cheat grass, buckwheat, mustard, red clover and beet. At this rate, however, cotton, corn, and cucumber had emerged and were thriving just as well as they were in the "blank" pan. At the 10 lb. per acre rate, there was complete suppression of clover and beet and marked suppression of wild oat, very slight effect on cheat grass, buckwheat, and mustard, and no effect on rye grass, cucumber, cotton and corn. All of the seeds which had been planted in the pan which had not been sprayed with the phosphorothioate had emerged and were in excellent condition. Accordingly, when used at the rate of 25 lbs. per acre S-(4-chlorophenyl) O,O-diethyl phosphorothioate is an unusually effective pre-emergent de-weeder in fields planted to cotton, corn and cucumber. At 10 lbs. per acre, it is effective in preventing the growth of grasses and a number of broad-leaf plants in fields planted to corn or cotton.

While the present phosphorothioates are most advantageously employed as herbicides by incorporating them into an oil-in-water emulsion as herein described, they may also be employed in other plant-destroying methods. Thus, they may be incorporated into solid carriers such as clay, talc, pumice and bentonite to give herbicidal compositions which may be applied to living plants or to surfaces which are to be freed from plant growth. They may also be mixed with liquid or solid agricultural pesticides, e. g., insecticides and fungicides. While solutions of the present compounds in organic solvents may be employed for preventing and destroying plant growth, we have found that the emulsions possess an improved tendency to adhere to the treated surfaces and that less of the active ingredients is required to give comparable herbicidal efficiency.

What I claim is:

1. The method of destroying undesired plants which comprises applying to said plants a toxic quantity of a herbicidal composition comprising a compound having the formula

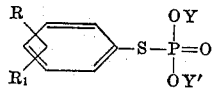

in which R and R' are selected from the class consisting of hydrogen, chlorine, NO$_2$ and alkyl radicals of from 1 to 5 carbon atoms and Y and Y' are selected from the class consisting of alkyl and chloroalkyl radicals of from 1 to 12 carbon atoms.

2. The method of destroying undesired plants which comprises applying to said plants a toxic quantity of a herbicidal composition comprising S-(4-chlorophenyl) O,O-dimethyl phosphorothioate as the essential active ingredient.

3. The method of destroying undesired plants which comprises applying to said plants a toxic quantity of a herbicidal composition comprising S-(4-chlorophenyl) O,O-diethyl phosphorothioate as the essential active ingredient.

4. The method of destroying undesired plants which comprises applying to said plants a toxic quantity of a herbicidal composition comprising bis(O,O-2-chloroethyl) S-2-nitrophenyl phosphorothioate as the essential active ingredient.

5. The method of destroying undesired plants which comprises applying to said plants a toxic quantity of a herbicidal composition comprising bis(O,O-2-chloroethyl) S-4-chlorophenyl phosphorothioate as the essential active ingredient.

6. The method of destroying undesired plants which comprises applying to said plants a toxic quantity of a herbicidal composition comprising S-(4-chloro-2-nitrophenyl) O,O-diethyl phosphorothioate as the essential active ingredient.

References Cited in the file of this patent

UNITED STATES PATENTS

| | | |
|---|---|---|
| 2,690,450 | Gilbert et al. | Sept. 28, 1954 |
| 2,730,547 | Dye | Jan. 10, 1956 |

FOREIGN PATENTS

| | | |
|---|---|---|
| 655,875 | Great Britain | Aug. 8, 1951 |
| 682,332 | Great Britain | Nov. 5, 1952 |

UNITED STATES PATENT OFFICE
CERTIFICATE OF CORRECTION

Patent No. 2,861,876                  November 25, 1958

Gail H. Birum

It is hereby certified that error appears in the printed specification of the above numbered patent requiring correction and that the said Letters Patent should read as corrected below.

Column 2, line 63, for "board-leafed" read -- broad-leafed --; line 64, for "corps." read -- crops. --; same column 2, line 67, for "faciliate" read -- facilitate --; column 3, line 32, for "(IIV)" read -- (IV) --.

Signed and sealed this 23rd day of August 1960.

(SEAL)
Attest:

KARL H. AXLINE
Attesting Officer

ROBERT C. WATSON
Commissioner of Patents